(12) United States Patent
Wu et al.

(10) Patent No.: US 6,990,095 B2
(45) Date of Patent: Jan. 24, 2006

(54) SELF-ROUTING DATA SWITCHING SYSTEM

(75) Inventors: Jingshown Wu, Taipei (TW); Kun-Tso Chen, Changhua (TW); Hen-Wai Tsao, Taipei (TW)

(73) Assignee: National Taiwan University, Taipei (TW)

( * ) Notice: Subject to any disclaimer, the term of this patent is extended or adjusted under 35 U.S.C. 154(b) by 939 days.

(21) Appl. No.: 09/969,396

(22) Filed: Oct. 2, 2001

(65) Prior Publication Data

US 2003/0063603 A1    Apr. 3, 2003

(51) Int. Cl.
*H04Q 11/00* (2006.01)
(52) U.S. Cl. .................. 370/367; 370/380; 370/387
(58) Field of Classification Search ............... 370/386, 370/387, 388, 366, 367, 380
See application file for complete search history.

(56) References Cited

U.S. PATENT DOCUMENTS

| | | | | |
|---|---|---|---|---|
| 4,965,788 A | * | 10/1990 | Newman | 370/410 |
| 5,272,696 A | * | 12/1993 | Munter et al. | 370/395.7 |
| 6,167,499 A | * | 12/2000 | Letham | 711/212 |
| 6,557,062 B1 | * | 4/2003 | Shaler et al. | 710/110 |
| 6,643,294 B1 | * | 11/2003 | Cooperman et al. | 370/413 |
| 2005/0047334 A1 | * | 3/2005 | Paul et al. | 370/229 |

OTHER PUBLICATIONS

U.S. Appl. No. 60/297,454.*

* cited by examiner

*Primary Examiner*—Chau Nguyen
*Assistant Examiner*—Anthony Sol
(74) *Attorney, Agent, or Firm*—Volpe and Koenig, P.C.

(57) ABSTRACT

A self-routing data switching system is disclosed. The data switching system includes a plurality of repetitive switching matrix planes, each of which is electrically connected between a less number of input terminals and a larger number of output terminals, thereby reducing the head-of-line blocking effect. Each switching matrix plane includes a switching element array interconnected between the input ports and the output ports for determining whether the data packet from an input port can be transmitted to a designated output port. The data switching system further includes a plurality of pre-processors to manage the input timing of data packets into the switching matrix array in order to avoid output conflict.

23 Claims, 9 Drawing Sheets

SELF-ROUTING DATA SWITCHING SYSTEM

FIELD OF THE INVENTION

The present invention relates to a data switching system, and more particularly to a self-routing data switching system.

BACKGROUND OF THE INVENTION

With the rapid growth of internet traffic load and the development of optical-fiber communication technology, the requirements on switches are getting more and more in order to avoid switches becoming bottlenecks for data transmission. For example, for a conventional input-buffering switch, blocking probability is relatively high, compared to an output-buffering one. The output buffering, however, is difficult to be achieved under the current hardware environment where the maximum transmission speed inside the switch is limited. As known, for output buffering, the transmission rate inside the switch has to be several times of that of the external transmission line. On the other hand, in order to minimize the head-of-line blocking effect of an input-buffering switch, various architectures were developed to solve this problem. Unfortunately, these architectures required complicated switching control units. Further, it is preferred that a switch is applicable to data transmission situations of asynchronous input data stream and variable packet length. In other words, the synchronizing, segmenting and reassembling operations of packets are omitted so as to comply with the requirements on high capacity and high quality for applying to an optical fiber network in the future. Self-routing is another issue for designing a switch. By self-routing, the central control unit for programming is no longer required.

SUMMARY OF THE INVENTION

An object of the present invention is to provide a data switching system which exempts from using a cost-inefficient central control unit.

Another object of the present invention is to provide a data switching system in which the count of input terminals is less than that of output terminals so as to reduce head-of-line blocking effect.

A further object of the present invention is to provide a data switching system which involves in a novel architecture to permit asynchronous and variable length packet transmission.

A still further object of the present invention is to provide a data switch system which is a modular design so as to be scalable by simply increasing input/output ports when necessary.

The present invention relates to a data switching system for switching data between N1 input ports and N2 output ports. The data switching system includes N1 first input terminals for electric connection to said N1 input ports, respectively; N2 first output terminals for electric connection to said N2 output ports, respectively; and M switching matrix planes electrically connected between said N1 first input terminals and said N2 first output terminals. Each of the switching matrix planes includes N3 second input terminals, each of which is electrically connected to at least one of said first input terminals for receiving input data from said first input ports connected thereto through said first input terminals; N4 second output terminals electrically connected to all of said first output terminals for outputting said input data to one of said N2 first output ports; N3×N4 switching elements interconnected as an array including N4 columns and N3 rows, said switching elements of a first column of said array being electrically connected to said N3 second input terminals, respectively, said switching elements of said $(N3)^{th}$ row being electrically connected to said N4 second output terminals, respectively. Each of said switching elements includes an address correlator electrically connected to one of said N3 second input terminals for receiving said input data from said first input terminals electrically connected to said one of said N3 second input terminals, correlating a designated output-port address of said input data with a preset address, and generating a status switching signal according to the correlating result; and a controlled connector electrically connected to said address correlator, switched between a first connection status and a second connection status in response to said status switching signal, and switched to said second connection status to allow said input data to be transmitted to an output port corresponding to said designated output-port address.

For example, the input data can be a data packet. The system further includes N1 line-cards electrically connected to the N1 input terminals, respectively. Each of the N1 line-cards includes a data-format converter electrically connected to a corresponding one of the input terminals for receiving an external data packet with a destination address, and tagging an output-port address corresponding to the destination address to the external data packet, thereby forming the data packet of the input data with the designated output-port address at a header section thereof; and an input buffer electrically connected to the data-format converter for buffering the output of the data packet.

Preferably, the data-format converter further tags a predetermined byte pattern which differs from the preset address in the address correlator to a tail section of the data packet, and tags a flag bit to each byte of the data packet to identify a nature of each byte. For example, the data-format converter tags the flag bit of 1 for a header or tail byte of the data packet, and the flag bit of 0 for a data content byte.

The address correlator correlates the designated output-port address at the header section of the data packet with the preset address when the flag bit indicates a header byte of the data packet, has the controlled connector switched to the second connection status and generates a busy signal when the designated output-port address and the preset address match with each other, correlates the predetermined byte pattern at the tail section of the packet data with the preset address when the flag bit indicates a tail byte of the data packet, and has the controlled connector switched to the first connection status and cancels the busy signal due to the difference of the predetermined byte pattern with the preset address.

Preferably, the system further includes N1/P pre-processors, each of which is electrically connected to P line-cards selected from the N1 line-cards for determining a connection status for data transmission from the P line-cards.

Each of the pre-processors preferably includes a controller electrically connected to the P line-cards, and generating a control signal in response to a triggering operation of any of the P line-cards; and a switching circuit electrically connected to the controller and the P line-cards, and switching the connection status in response to the control signal.

More preferably, the system further includes N3×M time sequencers equally divided into (N3×M)/Q input groups, each input group including Q time sequencers and electrically connected to one of said (N1/P) pre-processors.

Particularly preferred, the N3×M time sequencers are further equally divided into N3 output groups, and each output group includes M time sequencers electrically connected to said M switching matrix planes, respectively, for determining a time point for transmitting said data packet.

In an embodiment, the time sequencers of the same input group transmit respective data packets at the same time point, and the time sequencers electrically connected to the same switching matrix plane have a predetermined interval between every two adjacent time points. The interval has a length no less than a system clock period.

Preferably, each of the time sequencers includes a service buffer electrically connected to a corresponding one of the pre-processors for storing the data packet from the corresponding one of the pre-processors; a decoder electrically connected to the service buffer for reading and decoding the data packet stored in the service buffer, and generating an end signal when a tail byte of the data packet is read; and a trigger electrically connected to the service buffer and the decoder for determining a time point for the service buffer to output the data packet, and stopping the service buffer from outputting any further data in response to the end signal.

More preferably, each of the time sequencers further comprises a status switch electrically connected to the corresponding one of the pre-processors and the trigger, and generating a backpressure signal to the trigger and the corresponding one of the pre-processors in response to a hold signal from the corresponding one of the pre-processors in order to inform the trigger of the arrival of next data packet, and forbid the corresponding one of the pre-processors from transmitting a further data packet to the time sequencer.

For example, the status switch is a J-K type flip-flop.

Preferably, the controller of the pre-processor correlates the data packet inputted thereinto with the data packet stored in said service buffer of each of said time sequencers. When the two data packets are transmitted from the same line card, and the respective destination addresses of the data packets match with each other, the inputted data packet is transmitted to the same time sequencer having stored therein the data packet of the same destination address.

In general, N3=N1×R, in which R is an expansion ratio of each of said pre-processors, and equals to Q/P. For example, when R=1, it is indicated that each pre-processor is electrically connected to the same number of line cards and time sequencers. Alternatively, when R=1.5, an example is given by connecting each pre-processor between two line cards and three time sequencers.

Preferably, N2×M=N4.

The system may further includes M×N2 output buffers electrically connected to the M×N2 output terminals of the M switching matrix planes, respectively, for buffering the output of data stored therein.

The system may further includes N2 multiplexers, each of which is electrically connected between M output buffers selected from the M×N2 output buffers and one of the N2 output ports, and electrically connected to the M switching matrix planes through the M output buffers in order that the data stored in the M output buffers of different switching matrix planes are transmitted to a corresponding one of the N2 output ports in a multiplexing manner.

In general, N1=N2.

The present invention further relates to the use of an aforementioned data switching system in a packet switching network.

The present invention further relates to the use of an aforementioned data switching system in a circuit switching network.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
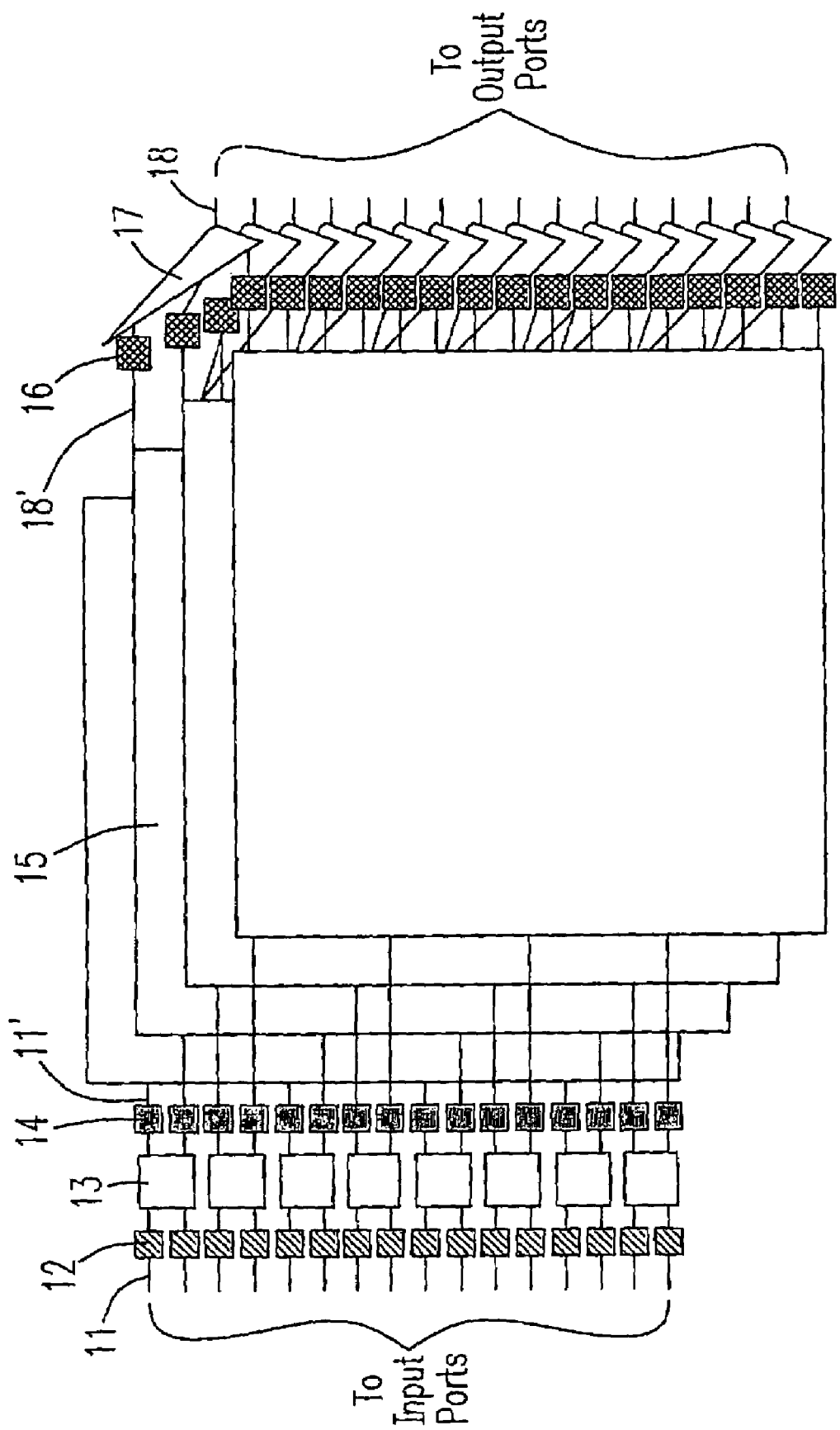
FIG. 1 is a schematic diagram showing a preferred embodiment of a data switching system according to the present invention.
Figure 2:
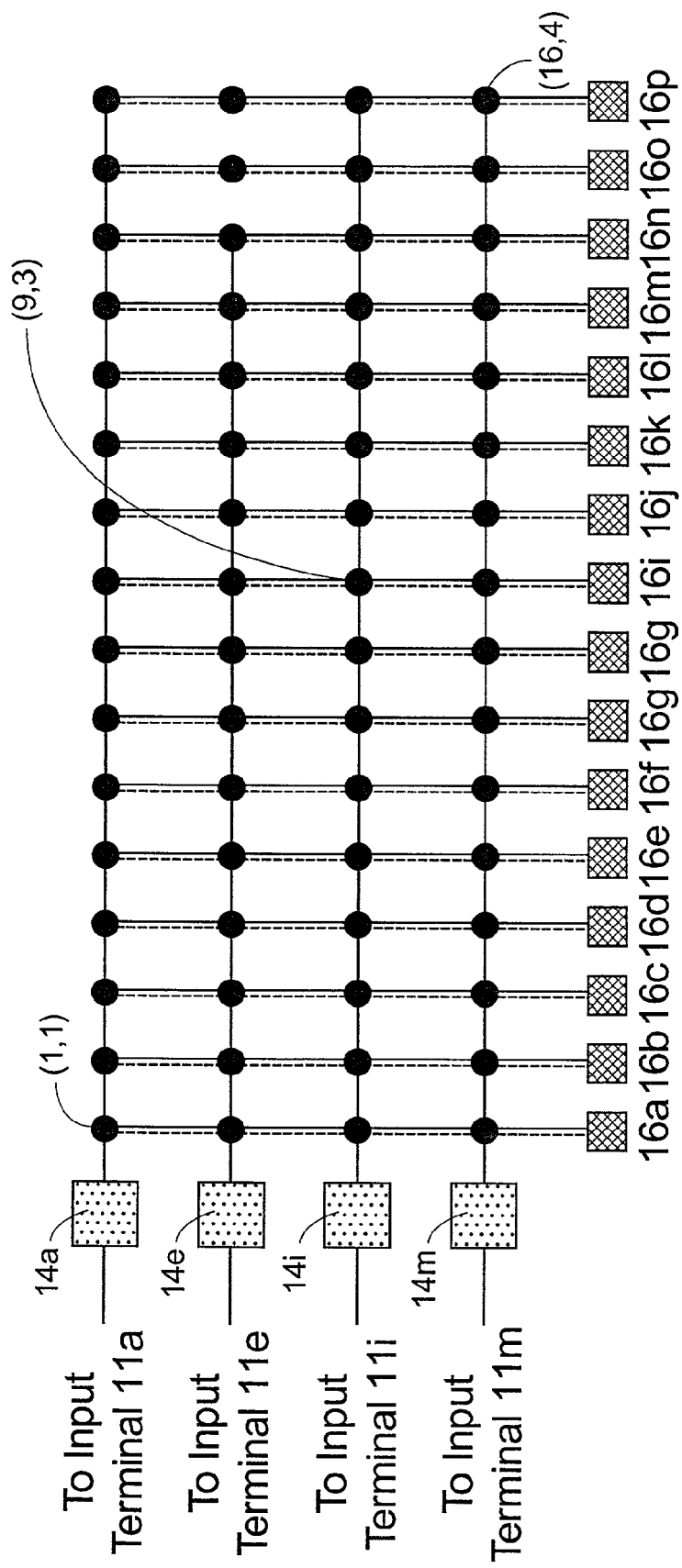
FIG. 2 schematically illustrates a switching element array included in each of the switching matrix planes of FIG. 1.
Figure 3:
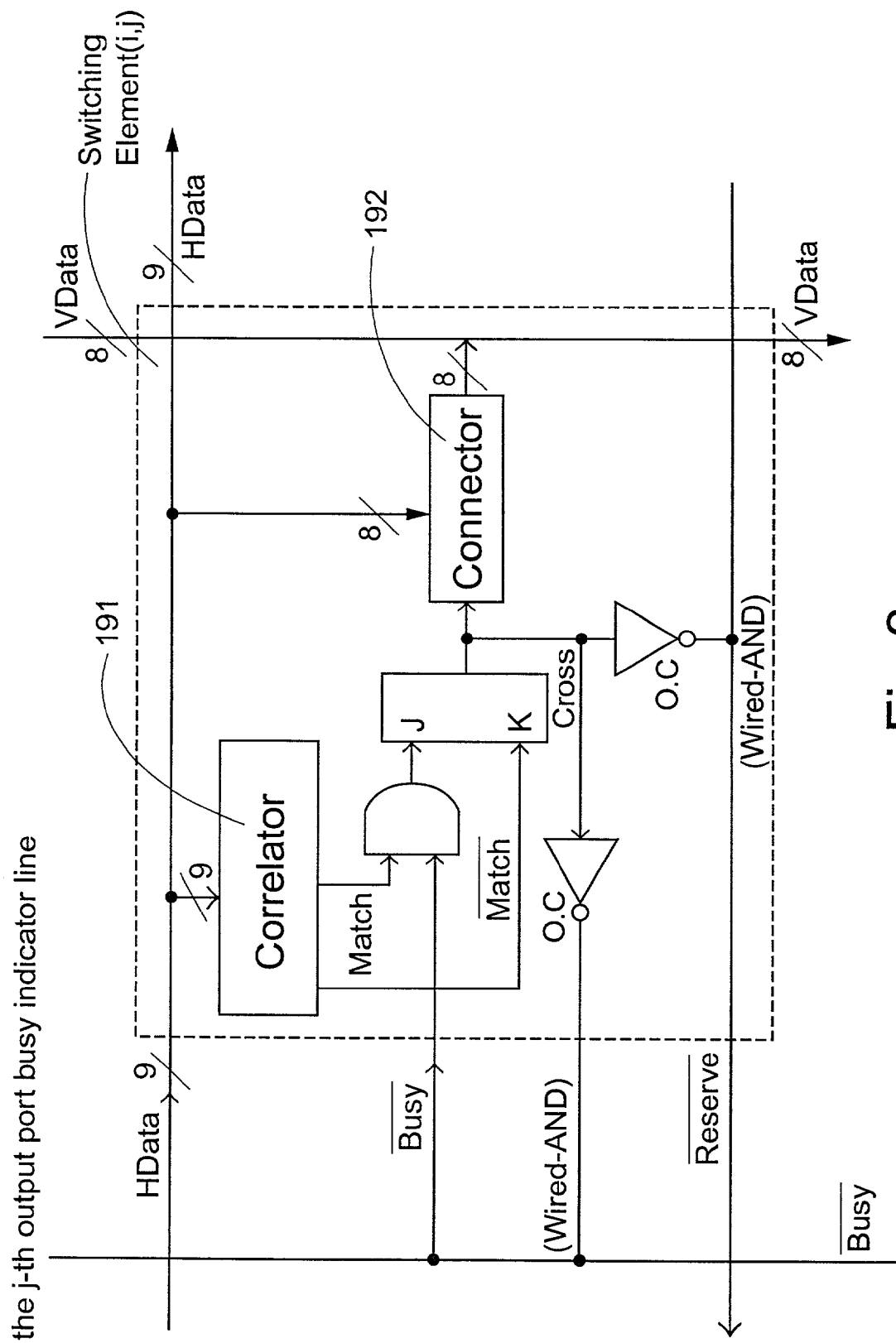
FIG. 3 is a schematic circuit diagram of a single switching element of FIG. 2.

Please refer to FIG. 1 which is a schematic diagram showing a preferred embodiment of a data switching system according to the present invention. The exemplified system is a 16×16 switch performing switching functions between sixteen input ports and sixteen output ports. The system includes sixteen first input terminals 11, sixteen line-cards 12, eight pre-processors 13, sixteen time sequencers 14, sixteen second input terminals 11', four switching matrix planes 15, sixty-four output buffers 16, sixteen multiplexers 17, sixteen first output terminals 18 and sixteen second output terminals 18', which are interconnected as shown. Therefore, each of the switching matrix planes 15 is electrically connected between four time sequencers 14a, 14e, 14i and 14m, and sixteen output buffers 16a~16p, and includes sixty-four switching elements (1,1) to (16,4) interconnected as an array including sixteen columns and four rows, as shown in FIG. 2. The switching elements (1,y) of a first column of the array are electrically connected to four of the sixteen first input terminals 11a, 11e, 11i and 11m, respectively, and the switching elements (x,4) of the last row are electrically connected to all the sixteen output terminals, respectively. The solid lines in the switching element array are indicative of data transmission lines, and the dash lines represent output-port busy indicator lines. Further referring to FIG. 3, each of the switching elements includes an address correlator 191 electrically connected to one of the four first input terminals 11a, 11e, 11i or 11m, and a controlled connector 192 electrically connected to the address correlator 191.

Figure 4:
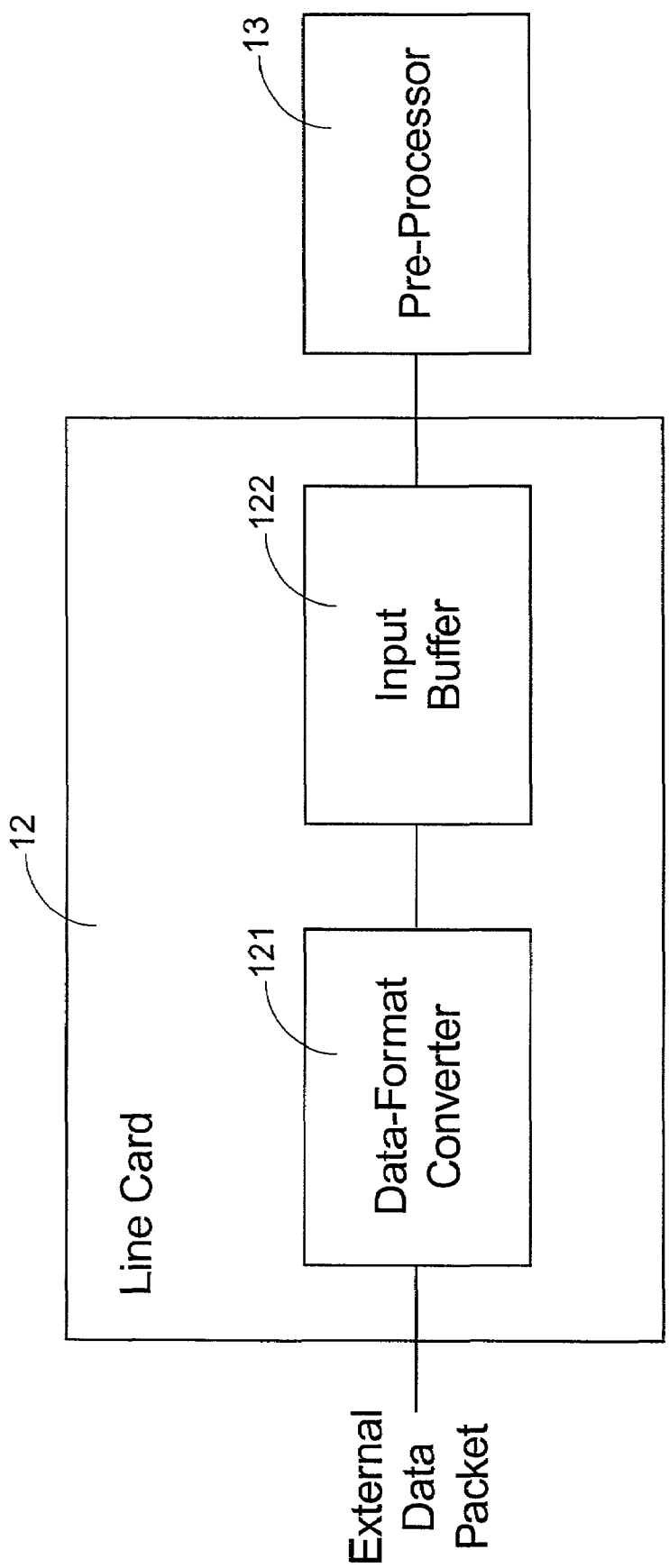
FIG. 4 is a schematic block diagram illustrating an embodiment of a single line-card of FIG. 1.

When an external data packet with a destination address is received from one of the sixteen first input terminals 11, and transferred to the corresponding input line-card 12, the line-card 12 tags an output-port address corresponding to the destination address to a header section of the external data packet, and then transmits the data packet to the corresponding pre-processor 13. The output port address, for example, may be up to four bytes, and may be generated via a look-up table according to a virtual path indicator realized from the header information of the external data packet. Preferably, the line-card 12 further tags a specific bit pattern, e.g. 01111110, to a tail section of the data packet so as to indicate the end of the data packet. In addition, each byte of the data packet is tagged thereto a flag bit in order to identify the nature of that byte. For example, a flag bit of 1 is tagged for identifying a header or tail byte, and a flag bit of 0 is tagged for identifying a data content byte. Therefore, a data stream output from the line-card 12 essentially includes nine bits, and the most significant bit is the flag bit. The schematic block diagram of the line-card 12 is illustrated in FIG. 4. As shown, the line-card 12 includes a data-format converter 121 for forming the data packet with the designated output-port address, and an input buffer 122 electrically connected to the data-format converter for buffering the output of the data packet when necessary.

Figure 5:
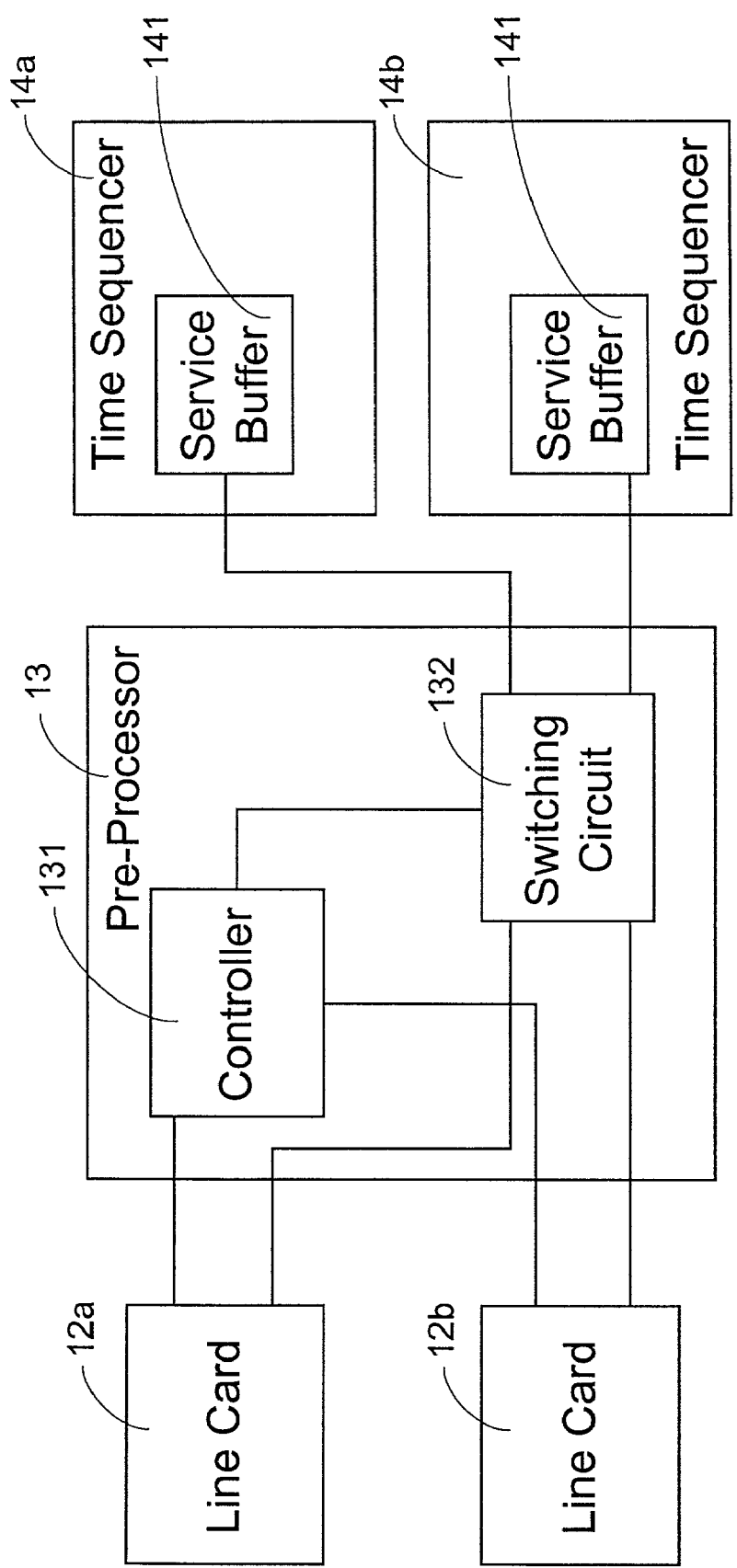
FIG. 5 is a schematic block diagram illustrating the connection and operations of two line cards and a pre-processor of FIG. 1.
Figure 6:
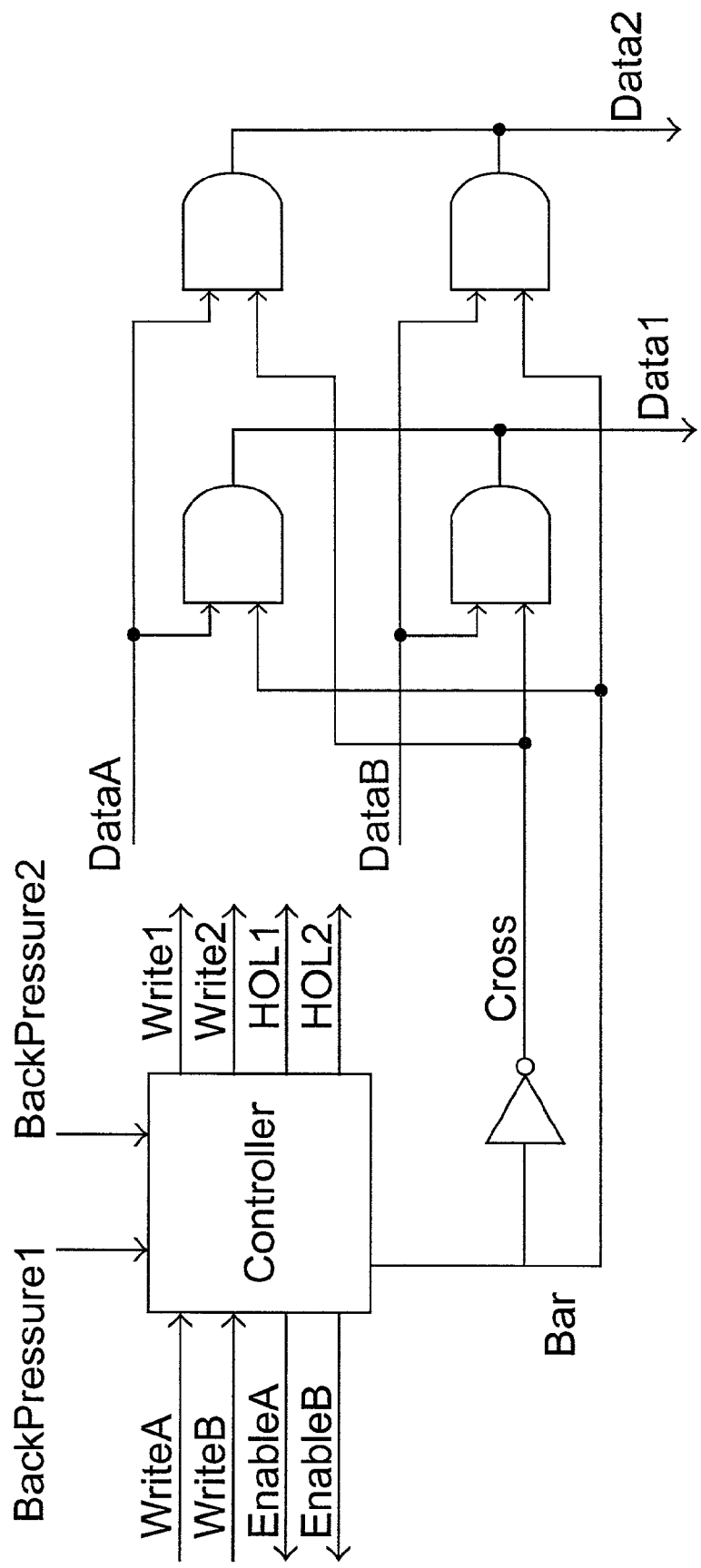
FIG. 6 is a schematic circuit diagram illustrating an embodiment of the pre-processor of FIG. 5.

Referring to FIG. 5, each of the pre-processors 13 includes a controller 131 electrically connected to two of the line-cards, e.g. 12a and 12b, and generating a control signal in response to a triggering operation of any of the two line-cards. The pre-processors 13 further includes a 2×2 switching circuit 132 electrically connected between the two line-cards 12a and 12b and two time sequencers 14a and 14b. Each of the time sequencers 14a or 14b includes a service buffer 141 for storing the switched packet until the switching operation is complete. Whenever the service buffer 141 is clear, the controller 131 of the pre-processor 13 will inform the line-card 12a or 12b to output another data packet from the input buffer 122 thereof to the service buffer 141. The schematic circuit diagram of the pre-processor 13 is shown in FIG. 6. The line-card 12a or 12b outputs a triggering signal WriteA or WriteB to inform the pre-processor 13 of the next data packet. The pre-processor 13 then outputs a control signal EnableA or EnableB to permit the transmission of the data packet. The cross point of the switching circuit 132 is an AND gate for switching the connection status between a cross status and a bar status. For the cross status, The signals DataA and Data2 are communicated with each other to permit the data packet of the line-card 12a to be transferred to the time sequencer 14b, and the signals DataB and Data1 are communicated with each other to permit the data packet of the line-card 12b to be transferred to the time sequencer 14a. On the contrary, for the bar status, the data packet of the line-card 12a is transferred to the time sequencer 14a, and the data packet of the line-card 12b to be transferred to the time sequencer 14b. In principle, the controller 131 will arrange the data packet to a idle time sequencer. When the controller 131 outputs a control signal HOL1 or HOL2 to inform the time sequencer 14a or 14b of the oncoming data packet, the idle sequencer 14a or 14b outputs a signal BackPressure1 or BackPressure2 to inform the controller whether it is available for receiving the data packet. Then, the data packet is written into the service buffer 141 of the idle sequencer 14a or 14b in response to the signal Write1 or Write2.

The time sequencer 14 is used for determining the timing that a data packet enters the switching matrix plane 15 to avoid output conflict. According to the present invention, the time sequencers 14 electrically connected to the same pre-processor 13 transmit respective data packets at the same time point, and the time sequencers 14 electrically connected to the same switching matrix plane 15 have a predetermined interval between every two adjacent time points. The interval is a transmission period of an output busy signal from the instant switching element to the last switching element, and in general has a length no less than a system clock period. Accordingly, if two data packets are heading for the same output port, the early data packet can use the transmission path first, and the late data packet is delayed by an output busy signal, and awaits to enter the switching matrix plane in the input buffer. The operational principle of the time sequencer 14 will be described hereinafter.

Figure 7:
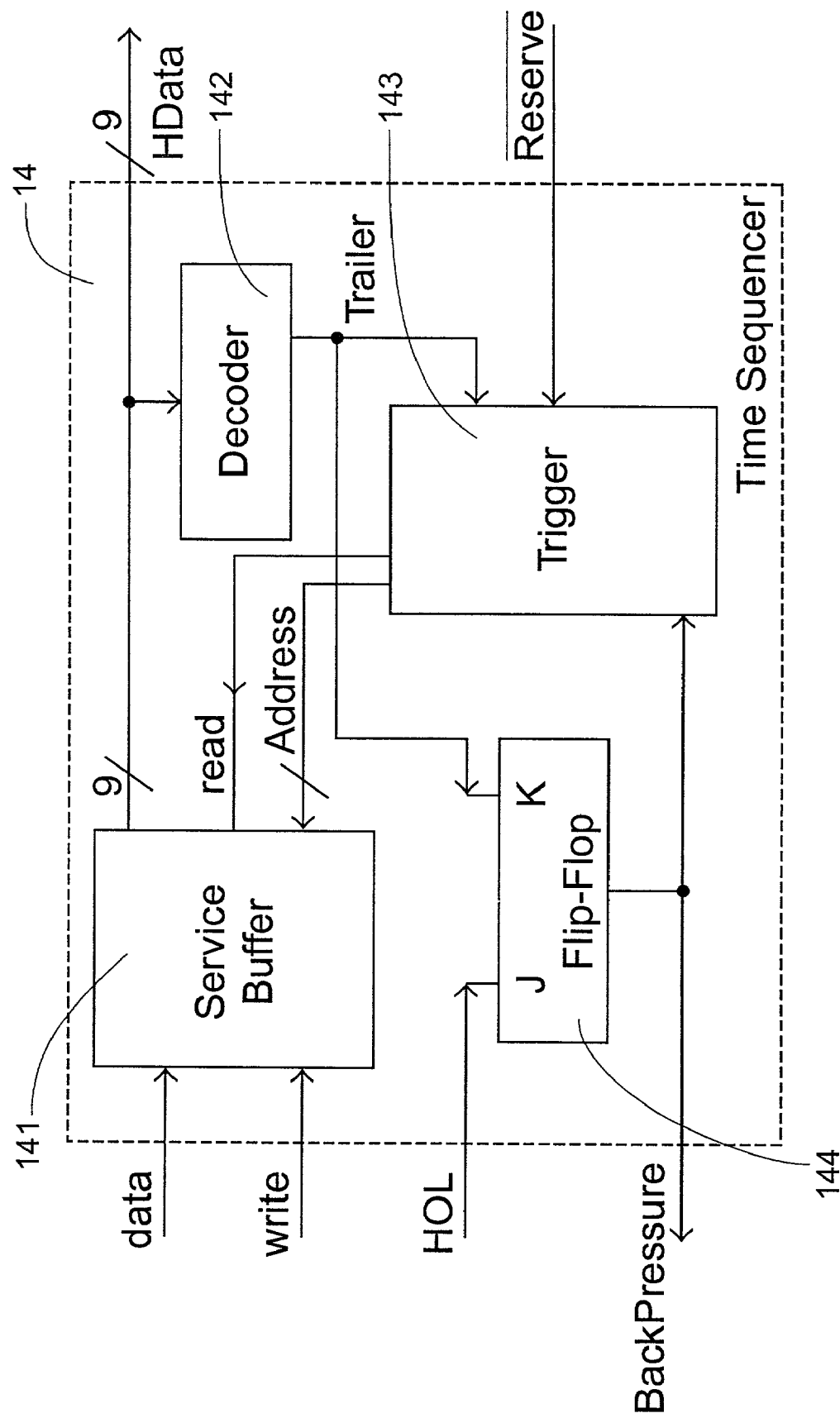
FIG. 7 is a schematic circuit diagram illustrating an embodiment of a single time sequencer of FIG. 1.
Figure 8:
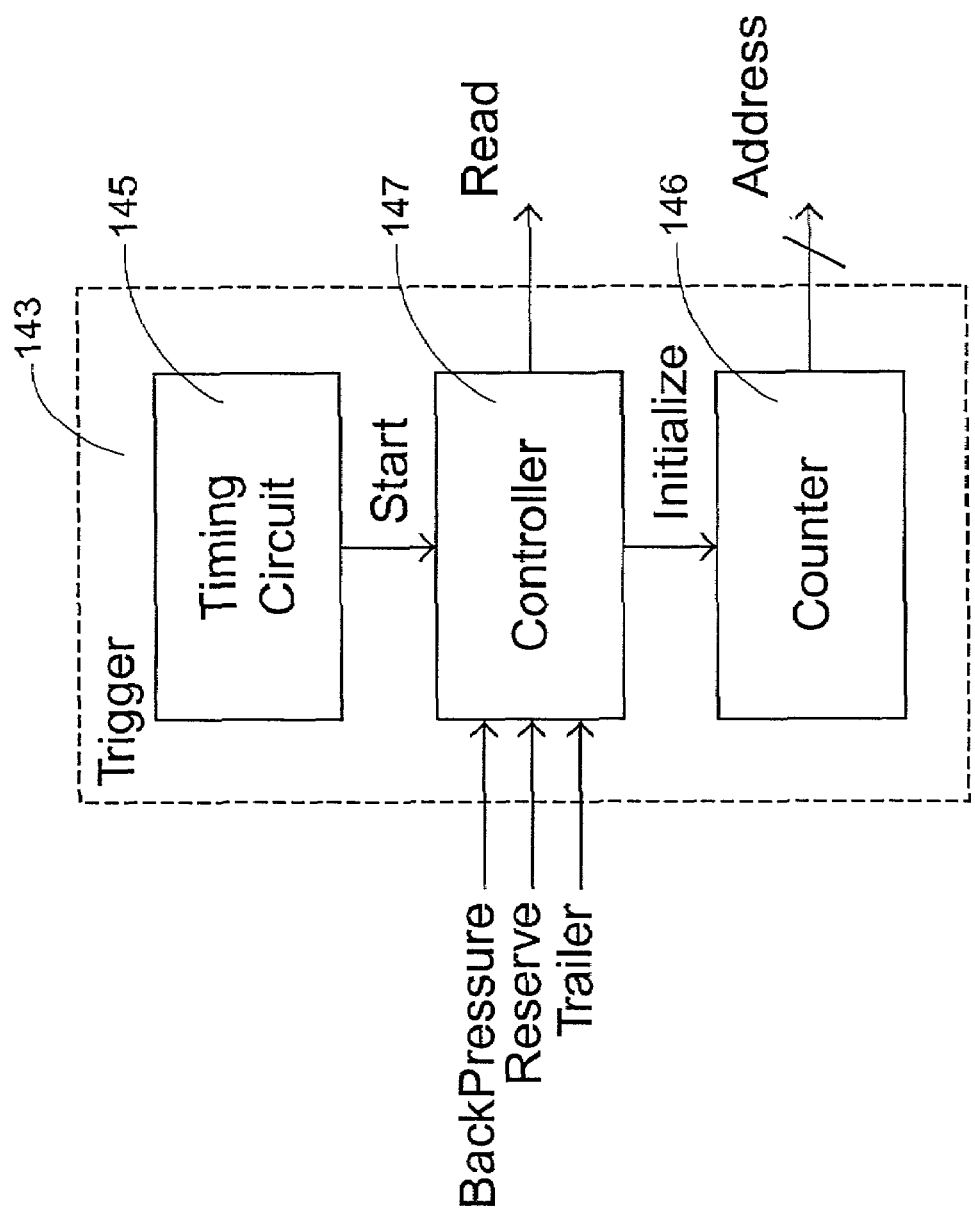
FIG. 8 is a schematic block diagram illustrating an embodiment of the trigger of FIG. 7.

Referring to FIG. 7, in addition to the service buffer 141, each of the time sequencers 14 includes a decoder 142, a trigger 143 and a J-K type flip-flop 144. When the service buffer 141 receives and stores therein a data packet, the J-K type flip-flop 144 is set in response to a control signal HOL, and a signal BackPressure is output to inform the trigger 143 of the oncoming data packet. The signal BackPressure inhibits the pre-processor 13 from transmitting another data packet to the service buffer 141. Upon the data packet is transmitted to the switching matrix plane 15, the decoder 142 reads nine bits from the service buffer to check if it is the end of the packet. If it is, a signal Trailer is output to inform the trigger 143 that the data packet transmission is finished, and allow the BackPressure status of the flip-flop 144 to be cancelled. Therefore, that time sequencer can receive another data packet again. The trigger 143 includes a timing circuit 145 for generating the above-mentioned time points in response to a universal timing clock, a counter 146 for reading the address of the data in the service buffer 141, and a controller 147 for controlling the data-reading operation, as shown in FIG. 8. During the aforementioned interval between two adjacent time points, if the packet is successfully switched, the switching element will output a reserve signal to have the trigger 143 stop counting but keep outputting the data from the service buffer 141. The reading operation of the trigger 143 from the service buffer 141 does not finish until the decoder 142 informs the trigger 143 of the end of the data packet. Then, the time sequencer becomes idle again, and ready for receiving next data packet.

The data packet outputted from the service buffer 141 of the time sequencer 14 enters the corresponding one of the switching matrix planes 15 (FIG. 1). Each switching matrix plane 15 includes a 4×16 switching element array (FIG. 2). Each switching element performs a 2×2 switching function (FIG. 3), and switching the connection status between a cross status and a bar status, as mentioned above. Please refer to FIG. 2 again. The data packets are transmitted either rightwards or downwards in the switching element array in the bar status, but rightwards and then downwards in the cross status. When the correlator 191 receives an input data packet from the time sequencer 14, the designated output-port address of the data bus is correlated with preset output-port addresses. It is assumed that the data bus Hdata of nine bits including a flag bit is a data from the left side, and the data bus VData of eight bits without any flag bit is a data from the upper side. The most significant bit, i.e. the flag bit, of the Hdata is checked to determine whether the coming byte is a header or a tail byte or not. If negative, i.e. the flag bit is "0", no address correlation operation is performed. On the contrary, if the flag bit is "1" to indicate a header or a tail byte, the correlator 191 determines whether the header byte matches with any of the preset output-port addresses. If the output-port addresses are found to match with each other, and the busy indicator line of the output port indicates that output port is idle, the controlled connector 192 is switched into a cross status to allow the data packet to be transmitted to the output port. Meanwhile, the busy indicator line is set to indicate that the output port is busy so as to prevent from packet collision, and a reserve signal is outputted to inform the time sequencer of the successful switching. When the correlator 191 detects that the tail section of the packet enters the switching element, the connection status of the controlled connector is switched to the bar status, and the busy indicator line indicates that output port is idle again. It is understood that because a predetermined byte pattern which differs from the preset output-port addresses has been tagged to a tail section of the data packet in the line card 12, the tail byte of the packet does not match with any output-port address. Therefore, the connection status of the controlled connector is in the bar status, and the busy indicator line indicates that output port is idle. On the contrary, if the header byte enters the correlator 191 to be checked, and that the output-port addresses do not match with each other is found or the busy indicator line indicates that the output port is busy, the connection status of the controlled connector remains in the bar status to prohibit data transmission to that output port. The data packet successfully switched in the switching matrix plane 15 is transmitted to output buffers 16 (FIG. 1). Each output port has four output buffers 16 connected to the four switching matrix plane 15, respectively. A multiplexer 17 is used for multiplexing the output of the four output buffers 16 to the first output terminal 18, and further to the designated output port.

According to the present invention mentioned above, the packet sequence preservation can still be achieved although the packets of the same source and destination addresses transmitted through different switching matrix planes seem to possibly violate the First-In-First-Out rule. Before being switched by the pre-processor, the data packet inputted into the controller of the pre-processor is correlated with the data packets stored in the downstream service buffers of the same group to identify whether they are transmitted from the same line card, and the destination addresses match with each other. If negative, either of the bar-type switching and the cross-type switch is selectively performed as mentioned in the above embodiment. On the contrary, if the correlation indicates a matching result, the inputted data packet has to be outputted to the same time sequencer having stored therein the data packet of the matching destination address. The pre-processor may keep the inputted data packet from entering the time sequencer until the data packet in the service buffer is successfully switched. Alternatively, the capacity of the service buffer in the time sequencer can be designed to be capable of storing therein two data packets at the same time. Accordingly, the integrity of the sequence can be assured for those data packets of the same source and destination addresses.

Figure 9:
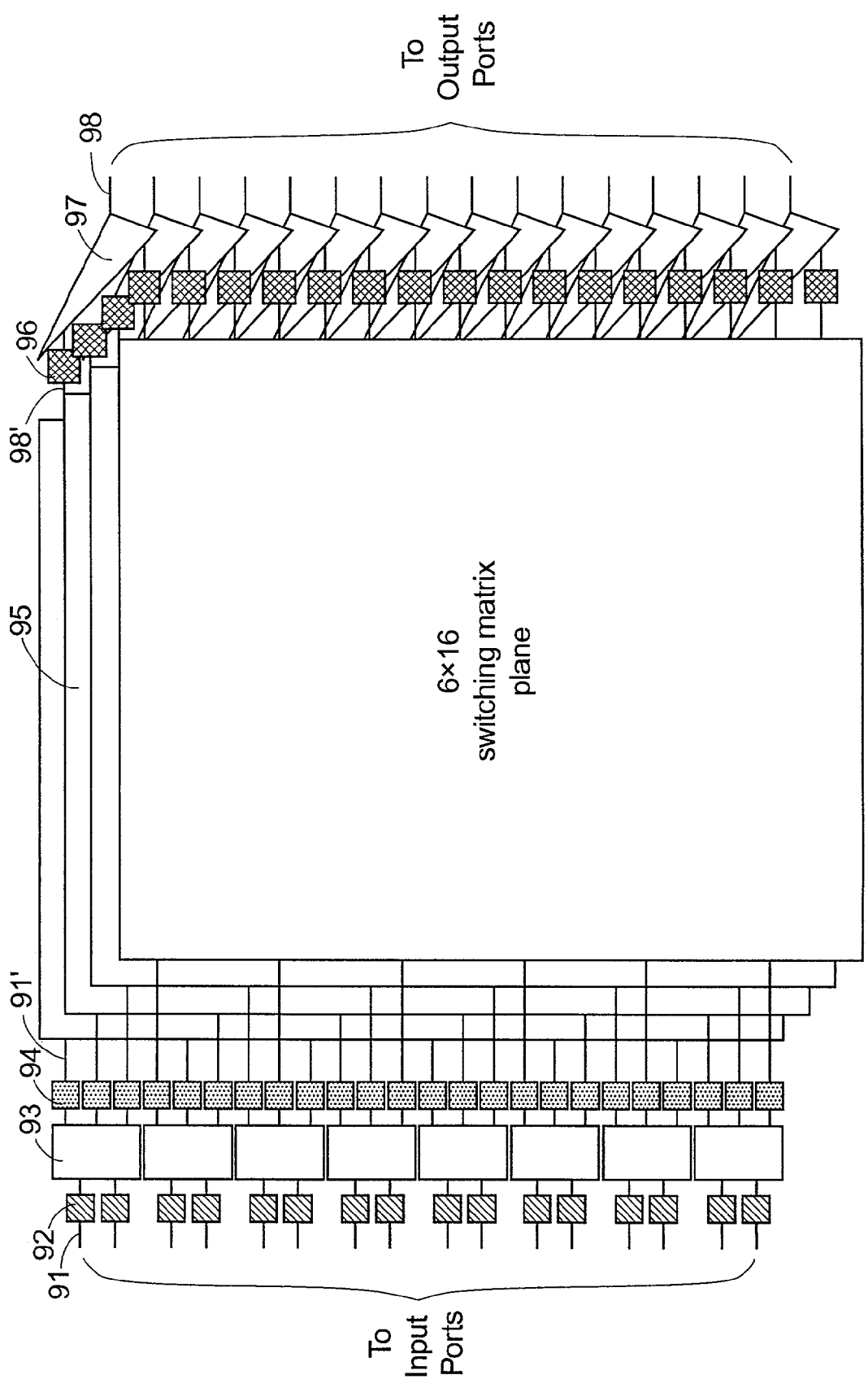
FIG. 9 is a schematic diagram showing another preferred embodiment of a data switching system according to the present invention.

It is to be noted that in the above embodiment, the expansion ratio is set to be 1. That is, assuming that each of the pre-processors is connected between P line cards and Q time sequencers, the expansion ratio (R)=Q/P=1. Concretely, the above embodiment performs a 2×2 switching function between two line-cards and two time sequencers. Such design is preferred under the considerations of balanced circuit complexity and transmission rate. Nevertheless, other switching schemes can also be used for specific priority requirements. Please refer to FIG. 9 which illustrates a data switching system according to the present invention. The expansion ratio of this embodiment is 1.5, and each of the pre-processors is electrically connected between two line cards and three time sequencers. Therefore, the count of the second input terminals 91' of the switching matrix planes is 1.5 times of the count of the first input terminals 91 electrically connected to the input ports, but the count of the second output terminals 98' of the switching matrix planes remains equal to that of the first output terminals 98 electrically connected to the output ports in this embodiment. Assuming that four switching matrix planes are still used, each of the switching elements will become a 6×16 array instead of a 4×16 array. On the other hand, if the same 4×16 switching element array is to be used for each switching matrix plane, six switching matrix planes will be required. As for the transmission algorithm, it is similar to that illustrated in the aforementioned embodiment, and is not to be redundantly described herein.

To sum up, each switching element according to the present invention operates independently, so no central control unit or complicated circuitry is required for coordination. Further, by tagging identifying and flag bits to the data packet, variable lengths of packets can be directly processed without division and recombination, and the data transmission can be performed asynchronously. Moreover, the data switching system is scalable by adding switching matrix planes and the related modular components. The circuit hardware of each switching element is a repetitive unit so as to be suitable for integrated circuit fabrication. By having the count of input terminals less than that of output terminals, the head-of-line blocking effect is reduced, and the high capacity and high communication rate can be achieved without the speedup of hardware. The data switching system is suitable to be used in a packet switching network or a circuit switching network.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data switching system for switching data between N1 input ports and N2 output ports, comprising:
    N1 first input terminals for electric connection to said N1 input ports, respectively;
    N2 first output terminals for electric connection to said N2 output ports, respectively;
    M switching matrix planes electrically connected between said N1 first input terminals and said N2 first output terminals, and each of which includes:
    N3 second input terminals, each of which is electrically connected to at least one of said first input terminals for receiving input data from said first input ports connected thereto through said first input terminals;
    N4 second output terminals electrically connected to all of said first output terminals for outputting said input data to one of said N2 first output ports;
    N3×N4 switching elements interconnected as an array including N4 columns and N3 rows, said switching elements of a first column of said array being electrically connected to said N3 second input terminals, respectively, said switching elements of said $(N3)^{th}$ row being electrically connected to said N4 second output terminals, respectively, and each of said switching elements including:

an address correlator electrically connected to one of said N3 second input terminals for receiving said input data from said first input terminals electrically connected to said one of said N3 second input terminals, correlating a designated output-port address of said input data with a preset address, and generating a status switching signal according to the correlating result; and a controlled connector electrically connected to said address correlator, switched between a first connection status and a second connection status in response to said status switching signal, and switched to said second connection status to allow said input data to be transmitted to an output port corresponding to said designated output-port; and N1/P pre-processors, each of which is electrically connected to P line-cards selected from said N1 line-cards for determining a connection status for data transmission from said P line-cards.

2. The system according to claim 1 wherein said input data includes a data packet.

3. The system according to claim 2 further comprising N1 line-cards electrically connected to said N1 input terminals, respectively, each of said N1 line-cards including:

a data-format converter electrically connected to a corresponding one of said input terminals for receiving an external data packet with a destination address and tagging an output-port address corresponding to said destination address to said external data packet, thereby forming said data packet of said input data with said designated output-port address at a header section thereof; and an input buffer electrically connected to said data-format converter for buffering the output of said data packet.

4. The system according to claim 3 wherein said data-format converter further tags a predetermined byte pattern which differs from said preset address in said address correlator to a tail section of said data packet, and tags a flag bit to each byte of said data packet to identify a nature of each byte.

5. The system according to claim 4 wherein said data-format converter tags said flag bit of 1 for a header or tail byte of said data packet, and said flag bit of 0 for a data content byte.

6. The system according to claim 4 wherein said address correlator correlates said designated output-port address at said header section of said data packet with said preset address when said flag bit indicates a header byte of said data packet, has said controlled connector switched to said second connection status and generates a busy signal when said designated output-port address and said preset address match with each other, correlates said predetermined byte pattern at said tail section of said packet data with said preset address when said flag bit indicates a tail byte of said data packet, and has said controlled connector switched to said first connection status and cancels said busy signal due to the difference of said predetermined byte pattern with said preset address.

7. The system according to claim 1 wherein each of said pre-processors includes:

a controller electrically connected to P line-cards, and generating a control signal in response to a triggering operation of any of said P line-cards; and a switching circuit electrically connected to said controller and said P line-cards, and switching said connection status in response to said control signal.

8. The system according to claim 7 further comprising N3×M time sequencers equally divided into (N3×M)/Q input groups, each input group including Q time sequencers and electrically connected to one of said (N1/P) pre-processors.

9. The system according to claim 8 wherein said N3×M time sequencers are further equally divided into N3 output groups, and each output group includes M time sequencers electrically connected to said M switching matrix planes, respectively, for determining a time point for transmitting said data packet.

10. The system according to claim 9 wherein said time sequencers of the same input group transmit respective data packets at the same time point, said time sequencers electrically connected to the same switching matrix plane have a predetermined interval between every two adjacent time points, and said interval has a length no less than a system clock period.

11. The system according to claim 8 wherein each of said time sequencers includes:

a service buffer electrically connected to a corresponding one of said pre-processors for storing said data packet from said corresponding one of said pre-processors;

a decoder electrically connected to said service buffer for reading and decoding said data packet stored in said service buffer, and generating an end signal when a tail byte of said data packet is read; and a trigger electrically connected to said service buffer and said decoder for determining a time point for said service buffer to output said data packet, and stopping said service buffer from outputting any further data in response to said end signal.

12. The system according to claim 11 wherein each of said time sequencers further comprises a status switch electrically connected to said corresponding one of said pre-processors and said trigger, and generating a backpressure signal to said trigger and said corresponding one of said pre-processors in response to a hold signal from said corresponding one of said pre-processors in order to inform said trigger of the arrival of next data packet, and forbid said corresponding one of said pre-processors from transmitting a further data packet to said time sequencer.

13. The system according to claim 12 wherein said status switch is a J-K type flip-flop.

14. The system according to claim 11 wherein said controller of said pre-processor correlates said data packet inputted thereinto with data packet transmitted from the same line card and stored in said service buffer, and designates said inputted data packet to be outputted to the same time sequencer having stored therein said data packet of the same destination address.

15. The system according to claim 8 wherein N3=N1×R, in which R is an expansion ratio of each of said pre-processors, and equals to Q/P.

16. The system according to claim 15 wherein R=1.

17. The system according to claim 15 wherein R=1.5.

18. The system according to claim 2 wherein N2×M=N4.

19. The system according to claim 18 further comprising M×N2 output buffers electrically connected to said M×N2 second output terminals of said M switching matrix planes, respectively, for buffering the output of data stored therein.

20. The system according to claim 19 further comprising N2 multiplexers, each of which is electrically connected between M output buffers selected from said M×N2 output buffers and one of said N2 output ports, and electrically connected to said M switching matrix planes through said M output buffers in order that said data stored in said M output buffers of different switching matrix planes are transmitted to a corresponding one of said N2 output ports in a multiplexing manner.

21. The system according to claim 1 wherein N1=N2.

22. A use of a data switching system according to claim 1 in a packet switching network.

23. A use of a data switching system according to claim 1 in a circuit switching network.

* * * * *